US012561212B2

(12) United States Patent
Kamath et al.

(10) Patent No.: US 12,561,212 B2
(45) Date of Patent: Feb. 24, 2026

(54) METHOD AND APPARATUS FOR PHASED TRANSITION OF LEGACY SYSTEMS TO A NEXT GENERATION BACKUP INFRASTRUCTURE

(71) Applicant: EMC IP Holding Company LLC, Hopkinton, MA (US)

(72) Inventors: Mahesh Kamath, Bangalore (IN); Savitha Bijoy, Trivandrum (IN); Jayashree Radha, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 5 days.

(21) Appl. No.: 17/376,898

(22) Filed: Jul. 15, 2021

(65) Prior Publication Data

US 2022/0382648 A1    Dec. 1, 2022

(51) Int. Cl.
| | |
|---|---|
| *G06F 11/00* | (2006.01) |
| *G06F 11/14* | (2006.01) |
| *G06F 11/1446* | (2026.01) |

(52) U.S. Cl.
CPC ...... *G06F 11/1464* (2013.01); *G06F 11/1435* (2013.01); *G06F 11/1451* (2013.01); *G06F 11/1469* (2013.01)

(58) Field of Classification Search
CPC ............. G06F 11/1464; G06F 11/1435; G06F 11/1451; G06F 11/1469; G06F 11/1458
See application file for complete search history.

(56) References Cited

U.S. PATENT DOCUMENTS

| | | | | |
|---|---|---|---|---|
| 9,098,432 B1 * | 8/2015 | Bachu | ................. | G06F 11/1453 |
| 9,529,617 B2 * | 12/2016 | Wang | ................. | G06F 9/45558 |
| 9,769,007 B1 * | 9/2017 | Dutch | ................. | G06F 11/3034 |
| 10,083,095 B1 * | 9/2018 | Chopra | .............. | G06F 11/1464 |
| 10,326,769 B2 * | 6/2019 | Ilieva | ..................... | G06F 16/22 |
| 10,599,528 B1 * | 3/2020 | Hemashekar | ....... | G06F 11/1469 |
| 10,768,966 B1 * | 9/2020 | Naenko | .............. | G06F 9/45545 |
| 10,838,912 B1 * | 11/2020 | Chopra | .............. | G06F 11/1458 |
| 11,159,627 B1 * | 10/2021 | Pachkov | ................. | H04L 61/50 |
| 11,416,340 B1 * | 8/2022 | Baptist | .................... | G06F 3/067 |
| 2006/0036658 A1 * | 2/2006 | Henrickson | ......... | G06F 11/1458 |
| | | | | 714/E11.122 |
| 2006/0036890 A1 * | 2/2006 | Henrickson | ......... | G06F 11/1464 |
| | | | | 714/2 |
| 2006/0112298 A1 * | 5/2006 | Wong | ..................... | G06F 3/0605 |
| | | | | 714/E11.034 |
| 2009/0112948 A1 * | 4/2009 | Nguyen | .............. | G06F 11/1466 |
| 2009/0222496 A1 * | 9/2009 | Liu | ..................... | G06F 11/1456 |
| | | | | 718/1 |

(Continued)

*Primary Examiner* — Loan L.T. Truong
(74) *Attorney, Agent, or Firm* — Workman Nydegger

(57)    ABSTRACT

One example method includes [searching a legacy data backup system and identifying, in the legacy data backup system, a legacy backup asset, identifying a type of the legacy backup asset, creating a wrapper service instance that corresponds to the type of the legacy backup asset, detaching the legacy backup asset from the legacy data backup system, receiving, by the legacy backup asset, backup calls and restore calls from a new data backup system that is different from the legacy data backup system, and servicing, by the legacy backup asset the backup calls and restore calls based on a state of the legacy backup asset.

18 Claims, 9 Drawing Sheets

ASSETS

1002 — LEGACY MANAGED

1

BACKUP/RECOVERY
VIA LEGACY SYSTEM

1004 — UNDER TRANSITION

2    API    RECOVERY VIA
LEGACY SYSTEM
BACKUP VIA
NEW SYSTEM

> 1000

TRANSITIONED

3    API    BACKUP/RECOVERY
VIA NEW SYSTEM

1006 —

(56) References Cited

U.S. PATENT DOCUMENTS

| | | | |
|---|---|---|---|
| 2009/0300633 A1* | 12/2009 | Altrichter | G06F 9/4856 |
| | | | 711/E12.001 |
| 2012/0011513 A1* | 1/2012 | McConaughy | G06F 9/545 |
| | | | 718/100 |
| 2012/0089572 A1* | 4/2012 | Raichstein | G06F 11/1461 |
| | | | 707/645 |
| 2014/0258241 A1* | 9/2014 | Chen | G06F 16/2365 |
| | | | 707/683 |
| 2015/0012567 A1* | 1/2015 | Powell | G06F 16/119 |
| | | | 707/809 |
| 2015/0355862 A1* | 12/2015 | Hayes | G06F 3/0689 |
| | | | 711/114 |
| 2016/0274978 A1* | 9/2016 | Strohmenger | G06F 11/1458 |
| 2017/0083403 A1* | 3/2017 | Salapura | G06F 11/1458 |
| 2018/0089033 A1* | 3/2018 | Tamura | G06F 16/178 |
| 2018/0343300 A1* | 11/2018 | Halter | G06F 9/5088 |
| 2019/0044799 A1* | 2/2019 | Browne | H04L 41/082 |
| 2019/0251000 A1* | 8/2019 | Achar | G06F 11/1456 |
| 2019/0347029 A1* | 11/2019 | Ramachandran | G06F 3/0673 |
| 2020/0104054 A1* | 4/2020 | Lei | G06F 3/0659 |
| 2020/0186416 A1* | 6/2020 | Hashimoto | G06F 8/60 |
| 2020/0233784 A1* | 7/2020 | Misra | G06F 11/3616 |
| 2021/0042194 A1* | 2/2021 | Bode | G06F 3/0647 |
| 2021/0133042 A1* | 5/2021 | Behera | G06F 11/1464 |
| 2021/0318891 A1* | 10/2021 | Purkait | G06F 8/35 |
| 2022/0342697 A1* | 10/2022 | Macfarlane | G06F 11/3612 |

* cited by examiner

1100

1102 — IDENTIFY ASSET TYPE

1104 — CREATE WRAPPER SERVICE INSTANCE

SERVICE HANDLER — 1105

1106 — DETACH ASSET FROM PARENT

1108 — MIGRATE METADATA TO SERVICE WRAPPER INSTANCE

1110 — RECEIVE BU/RESTORE CALLS

NEW BU SYSTEM — 1112

1114 — SERVICE CALLS PER STATE

METHOD AND APPARATUS FOR PHASED TRANSITION OF LEGACY SYSTEMS TO A NEXT GENERATION BACKUP INFRASTRUCTURE

FIELD OF THE INVENTION

Embodiments of the present invention generally relate to transitioning from legacy data protection systems to new data protection systems. More particularly, at least some embodiments of the invention relate to systems, hardware, software, computer-readable media, and methods for a phased approach to transitioning from a legacy data protection system to a next generation data protection system.

BACKGROUND

The emergence of next generation data protection platforms, such as the DellEMC PowerProtect for example, is the outcome of a modernization journey of backup and disaster recovery solution to meet the ever-changing needs of physical, virtual and cloud environments. However, most enterprises today still rely on legacy backup solutions to perform critical to day-to-day operations and, for various reasons, transition of the assets between backup systems cannot be implemented with a one-click, or rip-and-replace approach.

Data backup assets are critical systems for business data and applications.

Any change in the implementation of the data protection strategy needs planning, deployment considerations and, more importantly, the software update may not be viable immediately.

Depending on the size of the deployment, the transition from a legacy system to a new system may span from a few months to years. The ownership model, underlying complexity, and the approval processes of some enterprises could contribute to this delay, along with other modernization efforts like hardware refreshes, and re-platforming, for example.

Large enterprises may prefer lower-risk approaches with lesser disruption, and may have a low tolerance for missing their Recovery Point Objective (RPO). Hence, the transition in such scenario may require the coexistence of legacy and next-generation backup systems side-by-side until the transition is complete.

Further, support for all possible backup asset types may not be immediately available with the modern infrastructures. Also, a certain type of backup assets on a specific platform may not be supported due to limited customer base, or they will be delivered incrementally by the new system.

Finally, the disposal of the backup must adhere to the retention policy as per the organizational or regulatory needs. Building the recoverability path from the next-generation data protection platform for the backups from multiple legacy systems is complex and time consuming.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
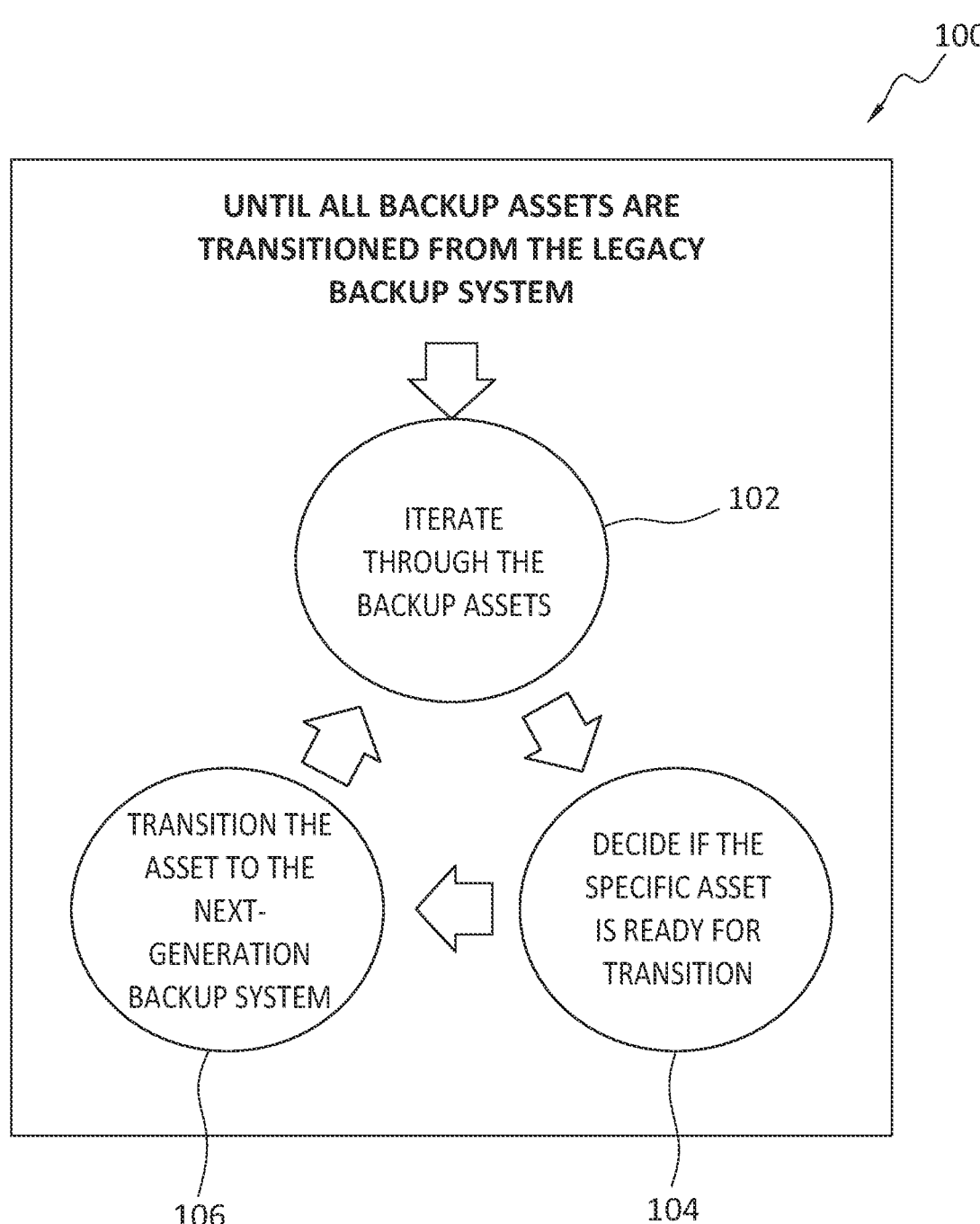
FIG. 1 discloses aspects of a phased transition cycle.

Embodiments of the present invention generally relate to transitioning from legacy data protection systems to new data protection systems. More particularly, at least some embodiments of the invention relate to systems, hardware, software, computer-readable media, and methods for a phased approach to transitioning one or more assets from a legacy data protection system to a next generation data protection system.

Note that, as used herein, a 'backup asset' or 'data backup asset' refers to an entity, which may comprise hardware and/or software, that is an element of a backup system, and that may be configured to perform part, or all, of a data backup process and/or a data restore process. A backup asset may be an element of a legacy backup system, and/or may be an element of a new backup system, examples of which may be referred to herein as being a 'next generation backup system.' A legacy backup system may be referred to with the shorthand notation 'legacy system' and a new backup system may be referred to with the shorthand notation 'new system.'

In general, example embodiments of the invention may involve an iterative process in which one or more backup assets are checked, on a per-asset basis in some embodiments, to determine if they are ready to be transitioned from a legacy system to a new system and, if so, the transition may be implemented. If a backup asset is not ready to be transitioned, the iterative process may be repeated for that backup asset. This process may continue until all backup assets have been transitioned.

The backup assets may go through multiple transition phases including, for example, a not-ready-for-transition phase, during which backup and recovery processes will continue to be implemented using the legacy backup system. In a subsequent phase, a backup asset may be ready for transition to the new system but may still need access to older backups. In this phase, data recovery may be implemented using the legacy system, while backups may be created using the new system. When the backup asset is ready to be moved, and access to older backups is no longer needed, the backup asset may be transitioned to the new system and all subsequent backup and restore processes performed with the new system.

In order to transition a backup asset, an abstraction layer may be implemented that serves as a bridge between the legacy system and the new system. The abstraction layer, in combination with a backup asset-specific wrapper instance running a wrapper service for a particular legacy backup asset, may continue to operate to protect the data of one or more clients, but may do so under the governance of the new backup infrastructure. Once the backup asset has transitioned to the new system, the wrapper instance and wrapper service may be terminated.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that backup assets may be transitioned in a phased manner, on a per-asset basis in some cases, from a legacy data protection system into a new data protection system. An embodiment may enable transition of a backup asset to a new backup system without requiring purpose built changes in the new backup system to support the transition. An embodiment may, within a single data protection environment, enable some backup assets to operated indefinitely on a legacy system, while enabling other backup assets to transition to a new backup system.

A. Aspects of Some Example Operating Environments

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, 10 replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in, or in connection with, existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Overview

In general, and with reference to the example scheme 100 disclosed in FIG. 1, example embodiments may implement an iterative approach, which may be performed on a per-asset basis, to transitioning of a backup asset from a legacy data protection system, also referred to herein simply as a 'legacy system,' to a new data protection system, also referred to herein simply as a 'new system.' The iterative approach may be implemented in relatively small, manageable, phases. An iteration of such an approach may begin at 102 for a particular backup asset, and then proceed to 104 where a decision is made as to whether the backup asset is ready to be transitioned and, if so, the backup asset may be transitioned 106 from the legacy system to the new system. The iterative process may continue, for each backup asset, or a selected subset of backup assets, in a data protection environment, until the backup assets have been transitioned from the legacy system to the new system.

In further detail, a phased transition approach according to some embodiments may involve fulfillment of various objectives to effectively and efficiently achieve backup asset transitions. One example of such an objective is the implementation of a mechanism to retrofit a legacy backup asset until it is ready to be transitioned. In particular, customers typically do not want to juggle around the old and new backup solutions and/or their installations to manage a data protection zone. Also, as a custodian of the product, the customer may need to create a channel for the migration of backup assets to phase out the legacy backup systems. Another such objective is the non-invasive integration of backup assets until the backup assets can be refreshed. Particularly, not all customers will allow the new software or packages to be loaded on the backup assets right away.

With considerations such as these in mind, some example embodiments may implement a non-invasive approach to align the legacy backup assets into the next-generation backup infrastructure in a phased manner, without the need for rearchitecting the new system to enable the transition. This model may also help in continuing the support for applications enabled in legacy systems until the next-generation software adds support for those applications. As such, example embodiments may enable the seamless integration of backup assets from the legacy systems and may allow the next-generation system to be built incrementally.

C. Aspects of Some Example Embodiments

C.1. Backup Asset Discovery and Vetting With reference now to FIG. 2, an initial part of a transition process may take the form of the example process 200 and, in general, may involve ingestion of one or more backup assets to a new data protection system, and a determination that a given backup asset is ready for the transition at a given time. Particularly, at 202 a discovery process may be performed in a protection environment to identify data backup assets and their respective data protection schemes, that is, the schemes that define particularly how the backup asset will operate to protect data. Next, for each backup asset, a determination 204 may be made as to whether the backup asset should be ingested, or transitioned, into the new DPS (data protection system). The outcome of the determination 204 may be 'YES' 206, or 'NO' 208 which may require a further assessment as to whether the backup assets should be retired 210 and removed from service, or whether the transition of the backup asset should simply be delayed 212. It may be the case that the example process may be repeated multiple times, such as once for each backup asset for example, to pick, or vet, some of the backup assets for transition (YES) and leave the rest to either decide later or for decommission (NO).

C.2 Example Transition Phases of A Backup asset

Figures 2, 3:
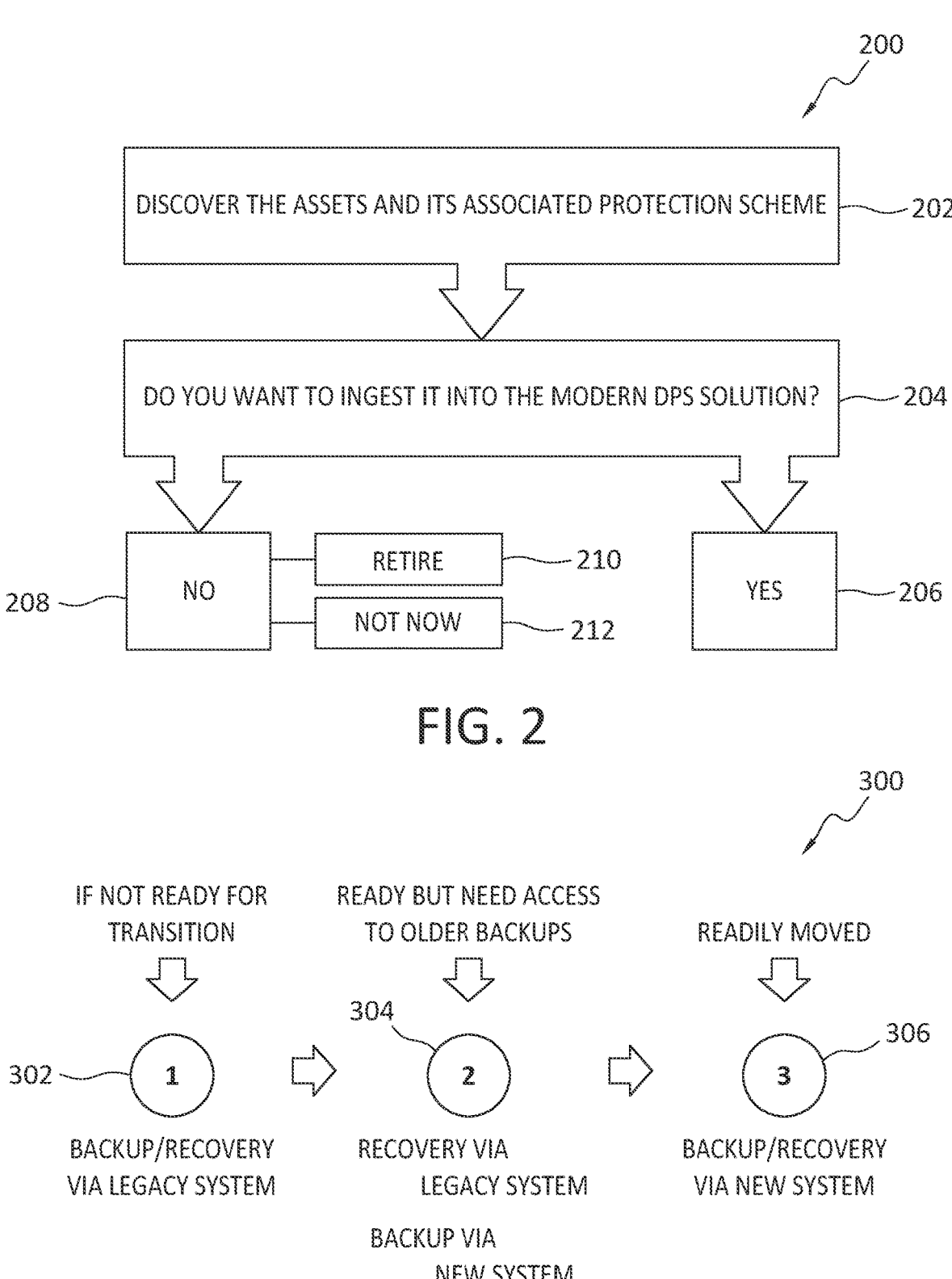
FIG. 2 discloses ingestion of legacy backup assets to a new backup system.
FIG. 3 discloses some example asset transition phases.

In general, one or more backup assets managed by a legacy system may transition through different phases until those backup assets are ready to be accommodated under, and operate with, the new data protection platform. With reference now to FIG. 3, an example scheme 300 is disclosed that indicates example transition phases for some backup assets.

In one phase 302, it may be determined that a backup asset is not ready to be transitioned from a legacy system to a new system. Backup assets in this state (1) may continue to perform their backup, and recovery, operations performed in connection with the legacy data protection system. In another phase 304, it may be determined that a backup asset is ready to be transitioned from a legacy system to a new system, but still requires access to older backups, such as may have been created with the legacy system. Backup assets in this state (2) may perform their recovery operations with the legacy data protection system, while the backup operations may be performed by backup assets in the new data protection system. In the phase 306, the backup assets may be ready to be transitioned from the legacy system to the new system and, accordingly, may be moved to the new system. Backup assets in this state (3) may perform both their backup and recovery operations in the new system.

With continued reference to FIG. 3, it may be useful for a particular backup asset to continue operating with a legacy backup agent as that backup asset may not be able to take on a new software or package update, such as may be required by the new backup system. As such, backup assets in these circumstances may remain at state (1). If the backup assets are ready to be transitioned, or have moved past state (1), they can be transitioned but may need a mechanism to seamlessly recover the backup copies from the legacy systems due, for example, to legal and compliance requirements. If no obligations of recovery of backup copies from legacy system exist for a backup asset, or the backup asset is past state (2), the backup asset may be moved to be under the purview of the new backup system to operate like a native backup asset under the new backup system. Until the backup assets are fully ready to natively transition to the new system, they may still need to be at least under the purview of the bridge or wrapper, that is, protection of those backup assets should be discoverable, monitorable, and their protection managed from the new system dashboard for all the backup assets within a logical protection zone or protection environment.

C.3 Abstraction Layer and Encapsulation

Figure 4:
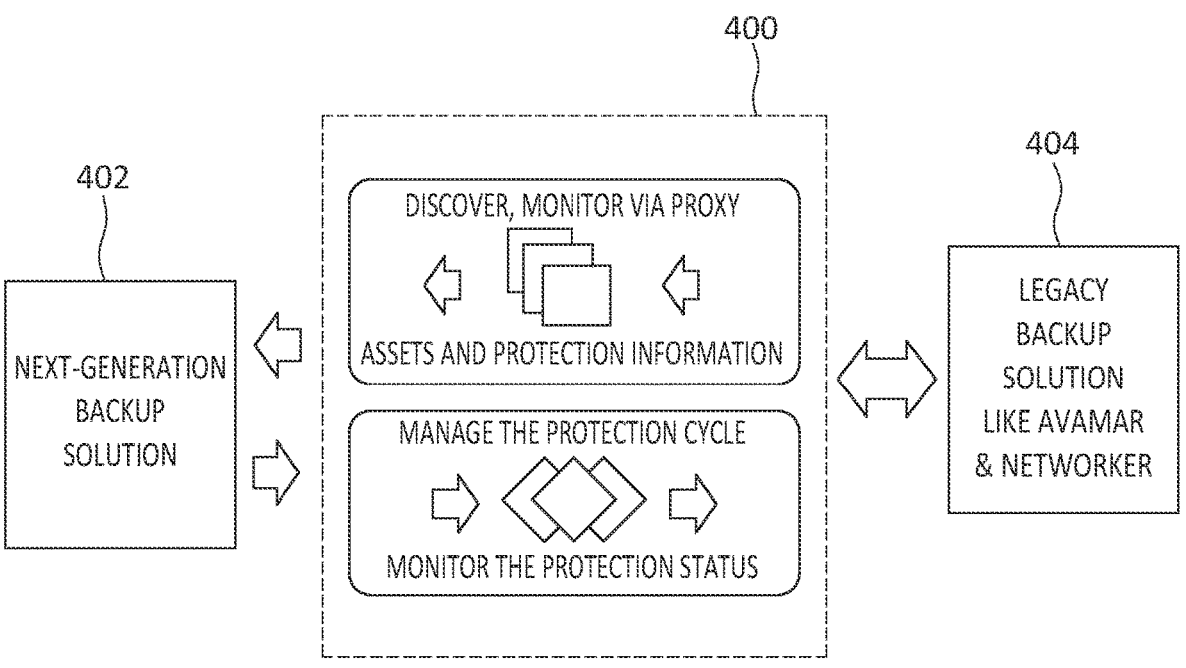
FIG. 4 discloses components of an example abstraction layer.

As disclosed in FIG. 4, a level of abstraction, which may comprise the abstraction layer 400, may be employed in some embodiments to compose the backup assets from the legacy system into the new backup infrastructure. In general, and as noted elsewhere herein, embodiments of the invention may operate to transition backup assets from a legacy system to a new system without the need to apply a software change in the backup asset currently through the legacy system.

In general, the abstraction layer 400, which may act as a mediator, may assume multiple roles. For example, the abstraction layer 400 may interact externally with the new backup system 402 for service contract implementation, regarding the backup asset, depending on the type of backup asset that needs to be abstracted. The service contract may specify, for example, how the new backup system 402 will employ the backup asset to protect data. Thus, the new backup system 402 may operate to discover backup assets in a protection environment, and then apply one or more data protection policies to data protection operations performed by those backup assets, where the policies may be reflected or included in the service contract for the backup assets. The abstraction layer 400 may also act internally as a bridge to one or more backup assets of the legacy backup system 404 and may have responsibility for the operation of those backup assets in the legacy backup system 404.

As indicated in FIG. 4, the abstraction layer 400 may operate in connection with the new backup system 402 to discover backup assets, as well as information about the legacy backup system 404. As well, the abstraction layer 400 may monitor performance of the legacy backup system. Information obtained as a result of the discovering and monitoring processes performed by and/or at the direction of the abstraction layer 400 may be passed by the abstraction layer 400 back to the new backup system 402. As well, the new backup system 402 may use information received from the abstraction layer 400 to pass instructions to the abstraction layer 400 concerning the operation of backup assets of the legacy backup system 404 and/or backup assets transitioning from the legacy backup system 404 to the new backup system 402. Both the legacy backup system 404 and the new backup system 402 may comprise respective backup agents that cooperate with respective agents of one or more backup assets to control the operation of the backup assets to protect data.

Figure 5:
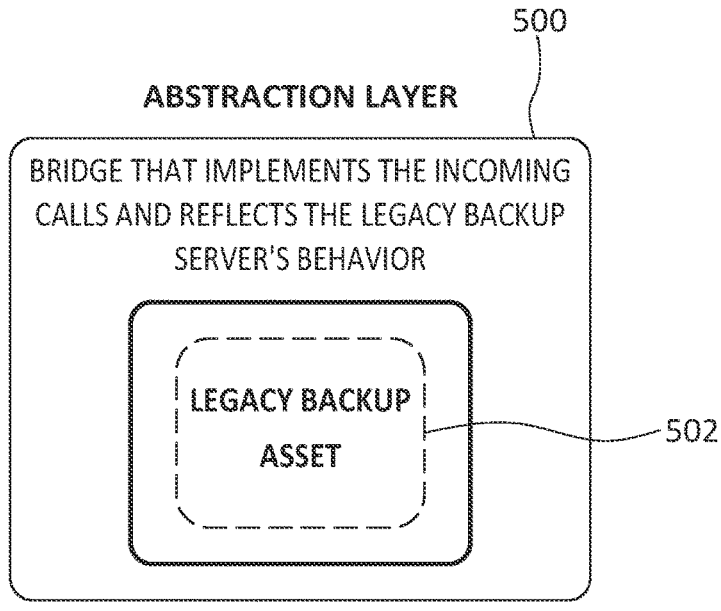
FIG. 5 discloses an encapsulation of a legacy backup asset of a legacy backup system.

With continued attention to FIG. 4, and directing attention now to FIG. 5 as well, details are provided concerning an example abstraction layer 500 and encapsulation of a legacy data protection system. As indicated there, the abstraction layer 500 may act as a bridge that implements incoming data protection calls from the backup asset(s) operating in the new backup system 402 (FIG. 4), and may also report on the behavior of the legacy backup system 404 (FIG. 4) with respect to backup assets 502 of the legacy backup system 404. With the model depicted in FIGS. 4 and 5, an existing backup agent of the legacy backup system 404 may continue to operate a backup asset under the purview of the bridge/ wrapper 400/500, but under the governance of the new backup system 402.

C.4 Wrapper Service and Related Considerations

To facilitate interaction of a backup asset with the legacy backup system 404 and/or new backup system 402, each backup asset may each include a respective instance of a wrapper service that may enable the backup asset to operate, with the new backup system 402, the way the backup asset was managed through the legacy backup system 404. In general, the wrapper service may, in effect, enable retrofitting of legacy backup assets with the capability needed for the legacy backup asset to interact with the new backup system 402, while still preserving certain capabilities of the legacy backup asset relating to the legacy backup system 404, such as the ability of the legacy backup asset to access old backups.

In some embodiments, the wrapper service instance may be bootstrapped with the backup asset metadata, that is, may be populated and/or instantiated with the backup asset metadata, from the legacy backup server to enable the seamless transition of the backup asset to the new backup system 402, as well as the recoverability of any older backups that were taken by the backup asset before the transition of the backup asset to the new backup system. The wrapper service may comprise an API (Application Program Interface) in some embodiments, and may also enable communications between the backup asset, legacy backup system 404, and new backup system 402.

In terms of wrapper service maintenance and updates, the wrapper service may be relatively minimalistic in terms of code that needs to be written and maintained. Except for the part where the next-generation contract needs to be bound to the legacy server components, there may be no code rewrite to talk to the legacy client. Example embodiments may reuse legacy components, as the shelf life of the wrapper service may be short. For example, the wrapper service may only be needed until a legacy transitioning of a legacy backup asset to state (2) (see FIG. 3) has been completed.

Figures 6, 7:
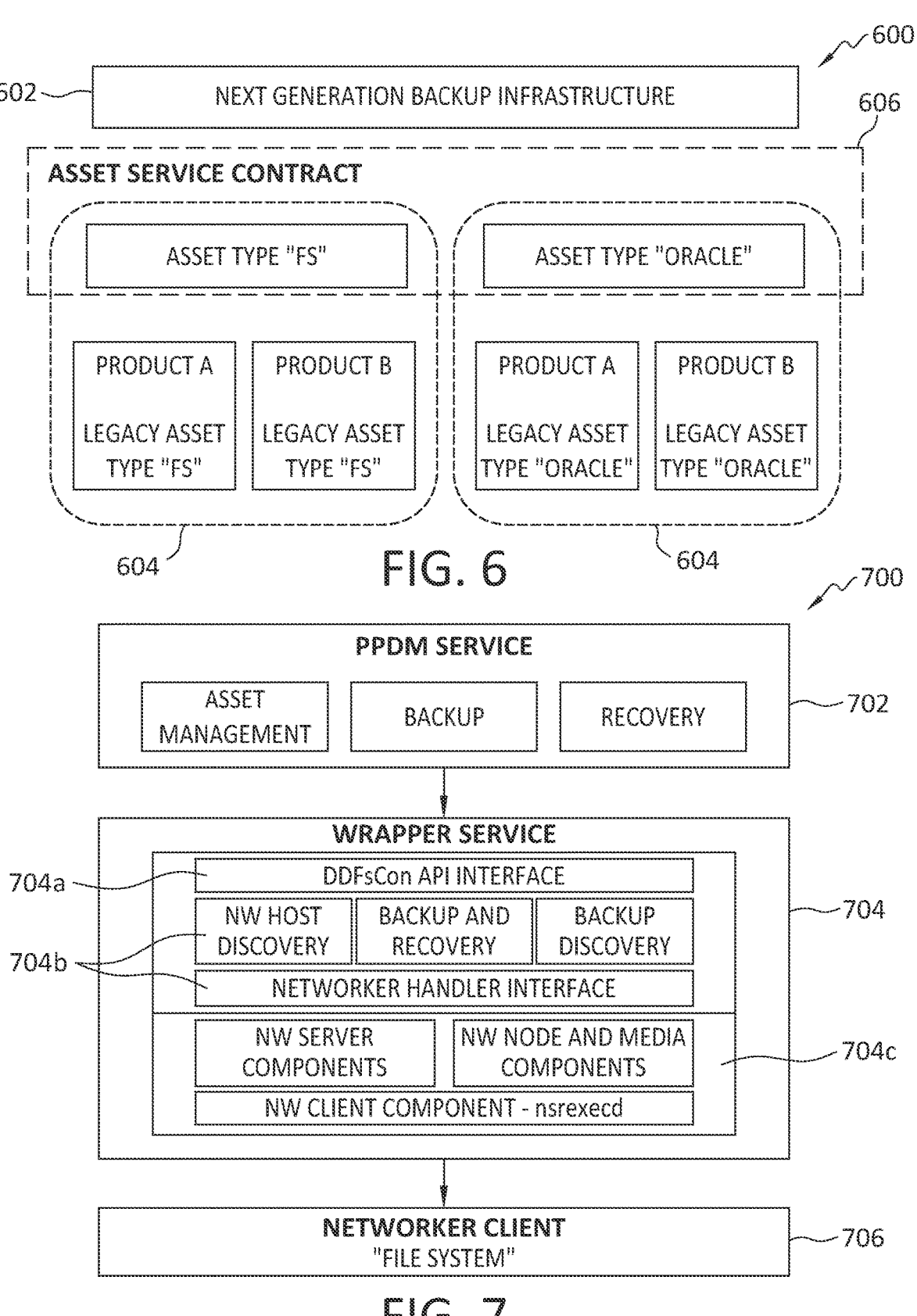
FIG. 6 discloses an example wrapper service implementation for a given type of asset.
FIG. 7 discloses an example of a proof of concept with NetWorker.

With reference next to FIG. 6, further details are provided concerning an example wrapper service implementation for a given type of backup asset, where bindings are provided for a specific legacy backup software. The example architecture 600 of FIG. 6 may include a new backup system 602, or 'next generation backup infrastructure,' that comprises hardware and/or software. The operations of the new backup system 602 with respect to one or more backup assets 604 may be dictated by a backup asset service contract 606. That is, the backup service contract 606 may comprise details concerning data protection operations that are to be performed by the backup assets 604 with respect to one or more clients. As such, a client API contract may be provided as an element or component of the backup asset service contract 606.

With respect to the client API contract, as long as that client API contract of the legacy system is maintained, the code written to bind a client API contract of the next-generation asset with a legacy backup asset, such as the assets 604 for example, may not need to be updated or modified, except to incorporate any bug fixes to the legacy backup server components. If the contract changes, it may be most likely that the API contract is extended with non-breaking changes, or the changes are versioned to ensure backward compatibility and, hence, the backup asset 604 may not always need to be refreshed. Containerization for the wrapper service may make it easier and quicker to refresh the services, rather than defining the wrapper mechanism for upgrading the service. An example method for containerization of the wrapper service is disclosed elsewhere herein.

With particular attention now to the example of FIG. 6, a single backup asset service contract 606 applies to multiple backup assets 604, however that is not necessarily required. In some cases, a backup asset service contract may be specific to only a single backup asset. Thus, the arrangement in FIG. 6 is presented only by way of example. The backup assets 604 may each be of a particular type and/or operate to back up particular types of data. For example, one of the backup assets 604 is type 'FS' (File System) which may operate to backup a file system, and the other backup asset 604 is type 'Oracle,' which may operate to backup an Oracle database. Finally, each of the backup assets 604 may host one or more products, such as software for example, operable to perform backup operations. In the example of FIG. 6, one of the backup assets 604 hosts legacy software Product A and Product B, both of which are Type 'FS.' As well, the other backup asset 604 hosts legacy software Product A and Product B, both of which are Type 'Oracle.'

Turning next to FIG. 7, further details are provided concerning example wrapper services. The example scheme 700 of FIG. 7 may comprise a data protection manager/service 702 that operates in connection with a wrapper service instance 704 to control the operation of a legacy backup asset 706, one example of which is a NetWorker filesystem backup asset that may operate to protect a file-system. The wrapper instance 704 may be instantiated at a particular legacy backup asset and, in some embodiments, a respective wrapper instance 704 is provided for each legacy backup asset that will be transitioned to a new backup system.

In more detail, the example data protection manager/service 702, which may be a new, or next generation, backup system, may function to manage one or more backup assets, and may also direct data backup and data recovery operations performed by those backup assets. These operations may be performed in connection with the wrapper service instance 704 which, in the example of FIG. 7, encompasses the PPDM (DellEMC Power Protect Data Manager) client API interfaces 704a, which may collectively define part or all of a 'contract layer,' various components 704b which may provide for the discovery, interface with, and use of, backup assets, such as NetWorker backup assets in this example. The wrapper service instance 704 may also encompass various other components, such as NetWorker specific selected components 704c. The various elements of the wrapper service instance 704 may provide the ability to bring legacy backup assets 706, such as a backup asset, or 'client,' of a NetWorker backup system, into the purview of the data protection manager/service 702. That is, the wrapper service instance 704 may act as a bridge between the data protection manager/service 702 and the legacy backup asset 706 to facilitate the transition of the legacy backup asset 706 into a new backup system such as the data protection manager/service 702. It is noted that PPDM is but one example of a data protection manager/service 702 that may be employed in some example embodiments, but the scope of the invention is not limited to PPDM.

In some embodiments, a client API contract may published that enables the data protection manager/service 702 to interact with, and obtain information from, a backup asset. The client API contract may comprise various interfaces such as, but not limited to, discovery interfaces to inspect the client system, client platform, and client data protection configuration. These interfaces may be used by the data protection manager/service 702 to pull information from one or more data protection assets to the NetWorker server, and the interfaces may also be used to enable remote agent interaction with the data protection assets. Still other interfaces that may be included in a client API contract include discovery interfaces that may enable the data protection manager/service 702 to fetch backup/index entries, such as by way of a query to a media/index database. Finally, the wrapper service instance 704 may enable a backup/recovery request originating from the data protection manager/service 702 to be fulfilled through a job execution infrastructure that may already be present with in legacy backup system infrastructure.

C.5 Example Encapsulation Sequence

Figure 8:
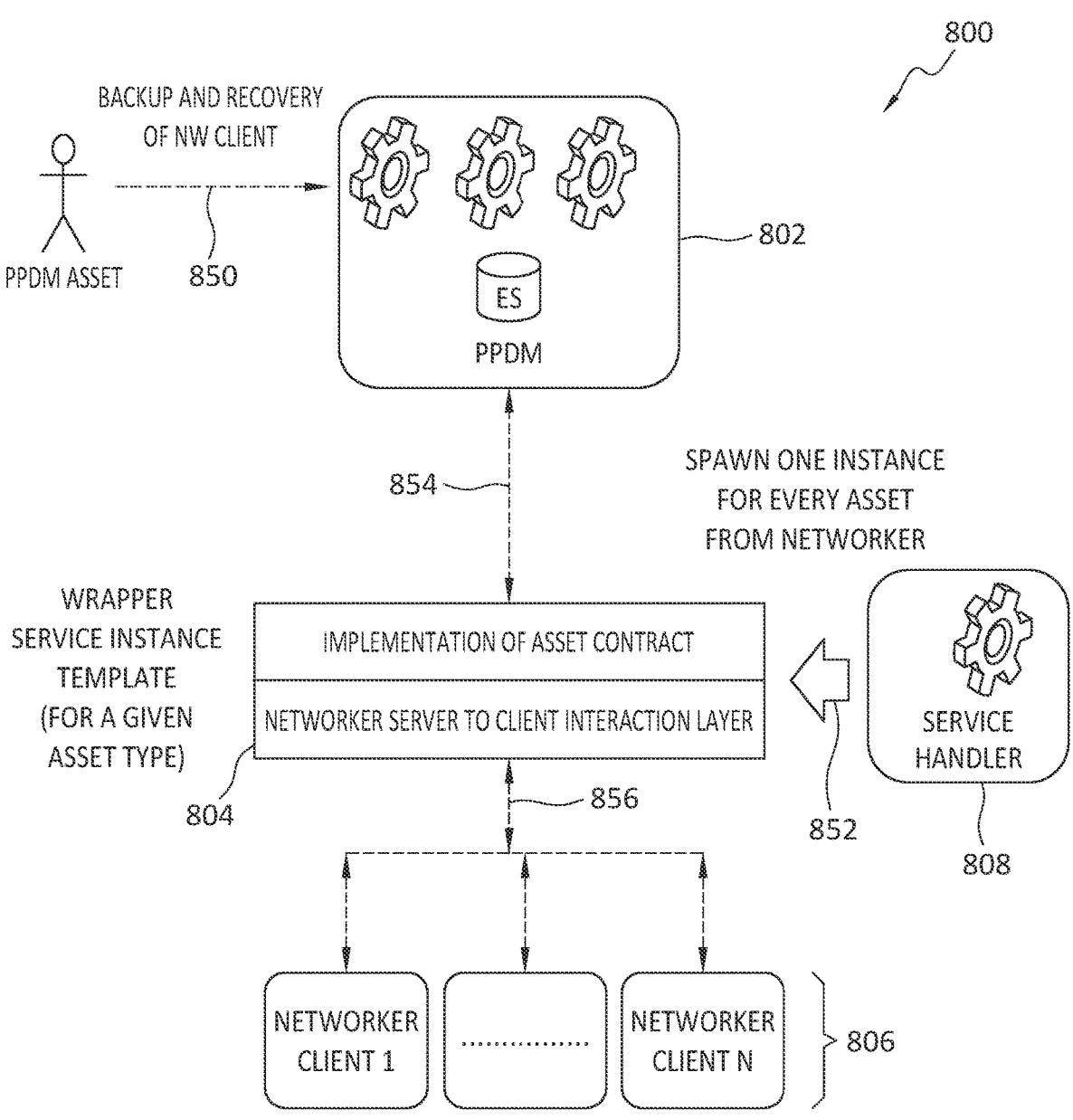
FIG. 8 discloses an example wrapper service template and its instantiation.

With reference next to FIG. 8, details are provided concerning an architecture 800 and associated methods to encapsulate a legacy backup asset, such as a NetWorker client for example, so that the legacy backup asset may be brought within the purview of a new backup system such that the new backup system can control the operation of the legacy backup asset using the bridge/wrapper. As noted in the discussion of FIG. 3, a legacy backup asset that cannot be readily transitioned to a new backup system may be placed in state (1). Once a legacy backup asset is ready to be transitioned to a new backup system, that is, State 3 in FIG. 3, the encapsulation of that legacy backup asset may be terminated. The example architecture 800 of FIG. 8 may include a new, or next . generation, data protection system 802, one example of which is the DellEMC PPDM system. The new data protection system 802 may interact with an instance of a wrapper service 804 to provide services to one or more legacy backup assets 806, examples of which include NetWorker clients. Respective instances of the wrapper service 804 may be spawned by a service handler 808.

In one example of a method 850 that may be performed in connection with the architecture 800, an administrator of a new backup system, such as PPDM for example, may initiate 850 a backup and/or recovery of a legacy backup asset 806 that may not yet have transitioned from the legacy backup system to the new backup system. Before the initiation 850, the service handler 808 must instantiate a wrapper service template to spawn 852 the wrapper service instance 804 for the legacy backup asset 806 concerning which the backup and/or recovery was initiated 850. The wrapper service instance 804 may be a data protection system 802 addressable endpoint by way of which the data protection system 802 may address 854 the legacy backup asset 806.

The particular wrapper service instance 804 may depend upon the type of the legacy backup asset. Thus, the wrapper service template for that type of legacy backup asset may have to be identified before the wrapper service instance 804 can be spawned. In some embodiments, there may be a unique wrapper service template for a given legacy backup asset type such as "File system" or "Oracle," for example, as The wrapper service instance 804 may be registered with the legacy backup asset 806 address and its credentials. Next, the legacy backup asset 806 may be detached from its parent server, that is, its legacy backup server (not shown in FIG. 8), and the metadata corresponding to the legacy backup asset 806 from its parent legacy backup server may be migrated 856 to the wrapper service instance 804. Finally, the legacy backup asset 806 may be attached to the wrapper service instance 804 as its backup server. At this point, backup and restore operations performed by the legacy backup asset 806 may be controlled by the new data protection system 802.

C.6 Example Deployment Model

Figure 9:
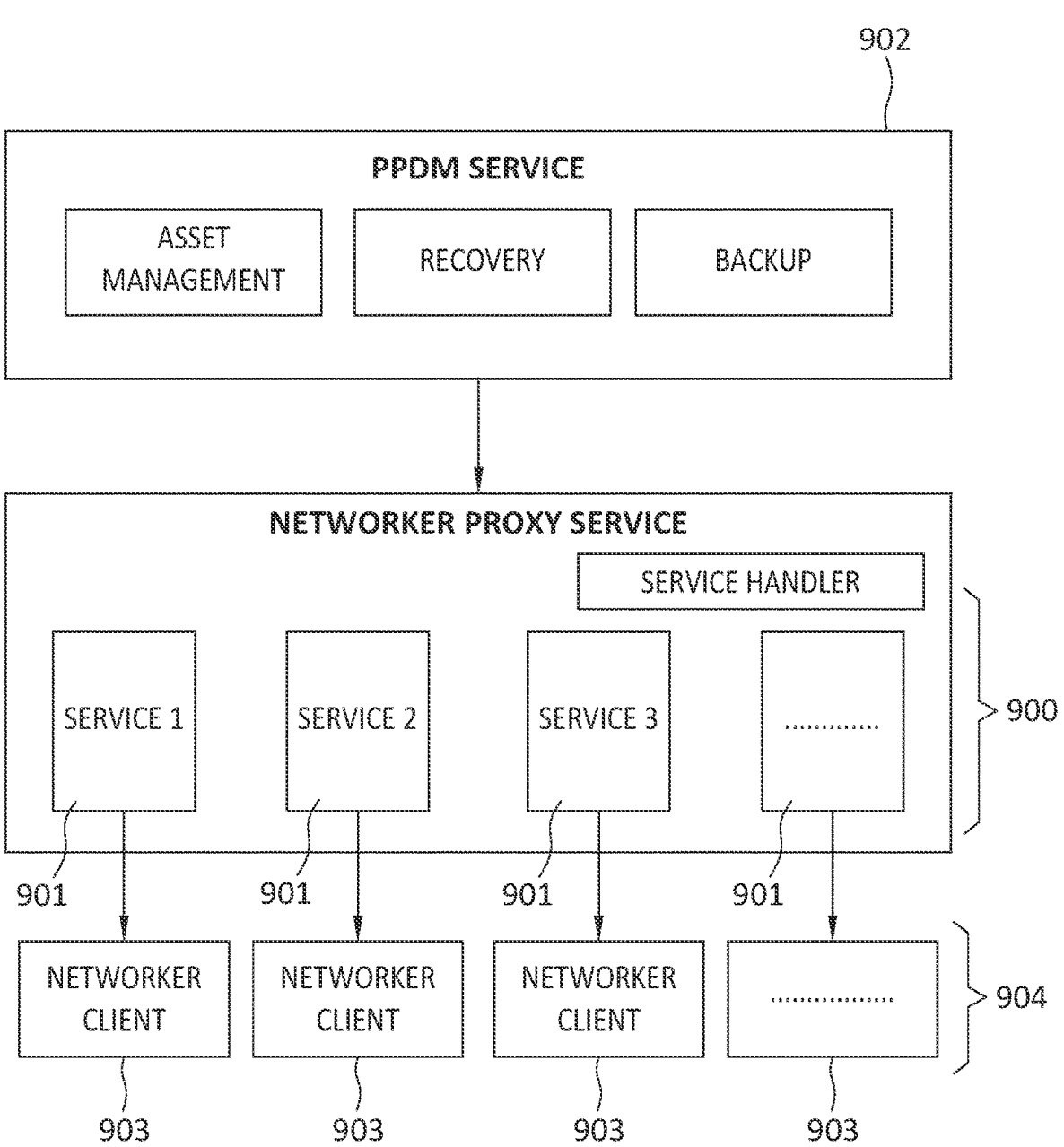
FIG. 9 discloses an example configuration of multiple proxy services per legacy backup asset.

In some example embodiments, a wrapper service may take the form of a container, such as the example containers 900 disclosed in FIG. 9. In some embodiments, a containers 901 may comprise a Docker container, but that is not necessarily required. Similar to the case of a file wrapper instance, a container 901 may communicate with a new data protection system 902, which may be hosted on a data protection server, to enable the control, by the new data protection system 902, of one or more legacy backup assets 904. The new data protection system 902 may be similar, or identical, to the new data protection system 702 discussed in connection with FIG. 7.

In some embodiments, there may be a respective container image for each wrapper service template. As noted elsewhere herein, a wrapper service template may be specific to a particular type of legacy backup asset 903. In general, a respective specific image of the container 901 may be run for each legacy backup asset 903 to be ingested. A respective address associated with each of the containers 900 may be used to identify and manage the legacy backup asset 904. This automatically takes care of the wrapper service refresh scenario and other container manageability aspects. Note that some embodiments may avoid the storage of database files in a container 901 writable layer, but the use of volume of a container 901 may be considered when determining whether or not the containers 900 may include database files.

Similar to the operation of the wrapper service instance 804, once a container 901 is up and running, the calls from the next-generation backup server of the new data protection system 902 may be routed to a corresponding legacy backup asset 903, by way of a corresponding container 901, as though the legacy backup asset were a native asset in the new data protection system 902. The backup and restore service implementation with the container 901 that is associated with a specific legacy backup asset 903 may work with the legacy backup asset 903 to query/spawn a job to backup/recover the data in a manner similar, or identical, to the way in which that service was performed when directed by the legacy backup system.

As discussed above then, example embodiments may, among other things, create isolated instance of wrapper services, so that the specific legacy backup asset can be encapsulated without patching the legacy backup asset to make it compatible with the new backup system, and then the legacy backup asset may be independently transitioned from the legacy backup system to the new backup system without impacting the rest of the legacy backup assets. This approach may also provide the flexibility of bringing the legacy backup assets from multiple instances of the legacy backup service instance into the transition phase under the purview of only a single instance of the next-generation backup infrastructure. Finally, a container 901 may be removed from service once the legacy backup asset 903 with which that container 901 is associated has been transitioned from the legacy backup system to the new backup system.

C.7 Example Legacy Backup Asset States

Figure 10:
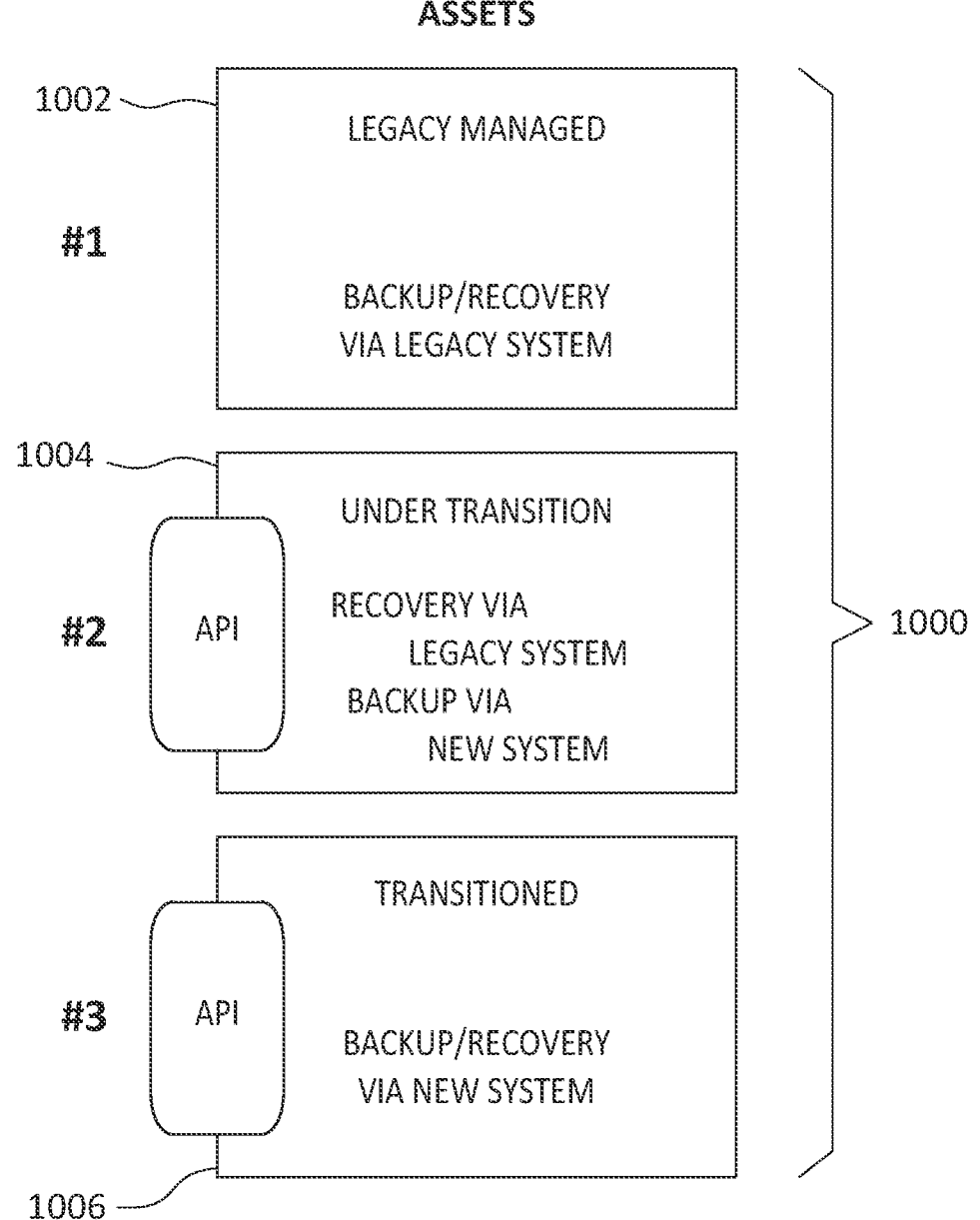
FIG. 10 discloses an example assets under state#1, #2 and #3.

Directing attention next to FIG. 10, a legacy backup asset may be in any of a number of different states 1000, as provided by example embodiments of the invention. In general, each state corresponds to a particular stage of a transition process of a legacy backup asset from a legacy backup system to a new, or next generation, backup system. When a legacy backup asset is in state #1 1002, both backup and recovery calls from the new backup system may be routed from the wrapper service instance, which may be running as a docker container, to the legacy backup asset. Even though the new backup system may control the operation of the legacy backup asset in state #1, the backup and recovery operations performed by the legacy backup asset may work the same was as though those operations were being directed by the legacy backup system.

In state #2 1004, the wrapper service instance corresponding to a legacy backup asset may act as a passthrough for the backup related calls from the new backup system, which may be redirected to an interface of the legacy backup asset so that the legacy backup asset operates as directed by the new backup system. Recovery operations may be performed by the legacy backup asset as though those recovery operations were being directed by the legacy backup system. Thus, when the legacy backup asset is in state #2 1004, the legacy backup asset may perform backup operations as it would if it were a native asset of the new backup system, that is, the legacy backup asset may perform backup operations in the way that backup operations are performed in the new backup system, while the legacy backup asset may perform recovery operations in the way that recovery operations are/were performed in the legacy backup system.

Finally, when the legacy backup asset has moved to state #3 1006, the transition of the legacy backup asset from the legacy backup system to the new backup system is complete. As such, the wrapper service container corresponding to that legacy backup asset may be dropped, that is, deactivated, as the legacy backup asset may then be ready with software required by the new backup system, and may have older backup copies required to be recovered. From this point on, the legacy backup asset may be natively managed from the next-generation backup infrastructure.

D. Further Discussion

Over last few decades, data protection platforms have been implemented in significant numbers. Even though such platforms may not necessarily fulfill every evolving needs of modern machineries, the enterprises using those platforms may have already made large scale investments and may be dependent on the partner ecosystems built around them for extension and customization. Hence, creating touch points for the phased migration of backup assets may be a key strategic element for businesses to retain and expand the data protection customer base in the enterprise IT landscape. Correspondingly, example embodiments may implement various useful functionalities relating to the transitioning of backup assets from a legacy backup system to a next-generation backup system. For example, some embodiments may be non-invasive in terms of updates that are needed to be implemented on the backup assets, without requiring any purpose-built changes in the next-generation backup infrastructure to support the transition of the backup assets.

As another example, some embodiments may enable a customer to initiate the transition for some of their backup assets so as to experience the changes that will be implemented by the next-generation backup solution, and the customer may then prepare the transition of the assets in a phased manner, which also keeps the risk of disruption lower. Finally, for backup assets that may need to remain in a legacy backup system indefinitely, or possibly forever, due to customizations such as lock-ins to the legacy system, or due to lack of support for the backup assets in the next-generation backup software, such as dependency on the tapes or support for MediTech apps, administrators may employ example embodiments to continue the protection of such specific customer workloads.

E. Example Methods

Figure 11:
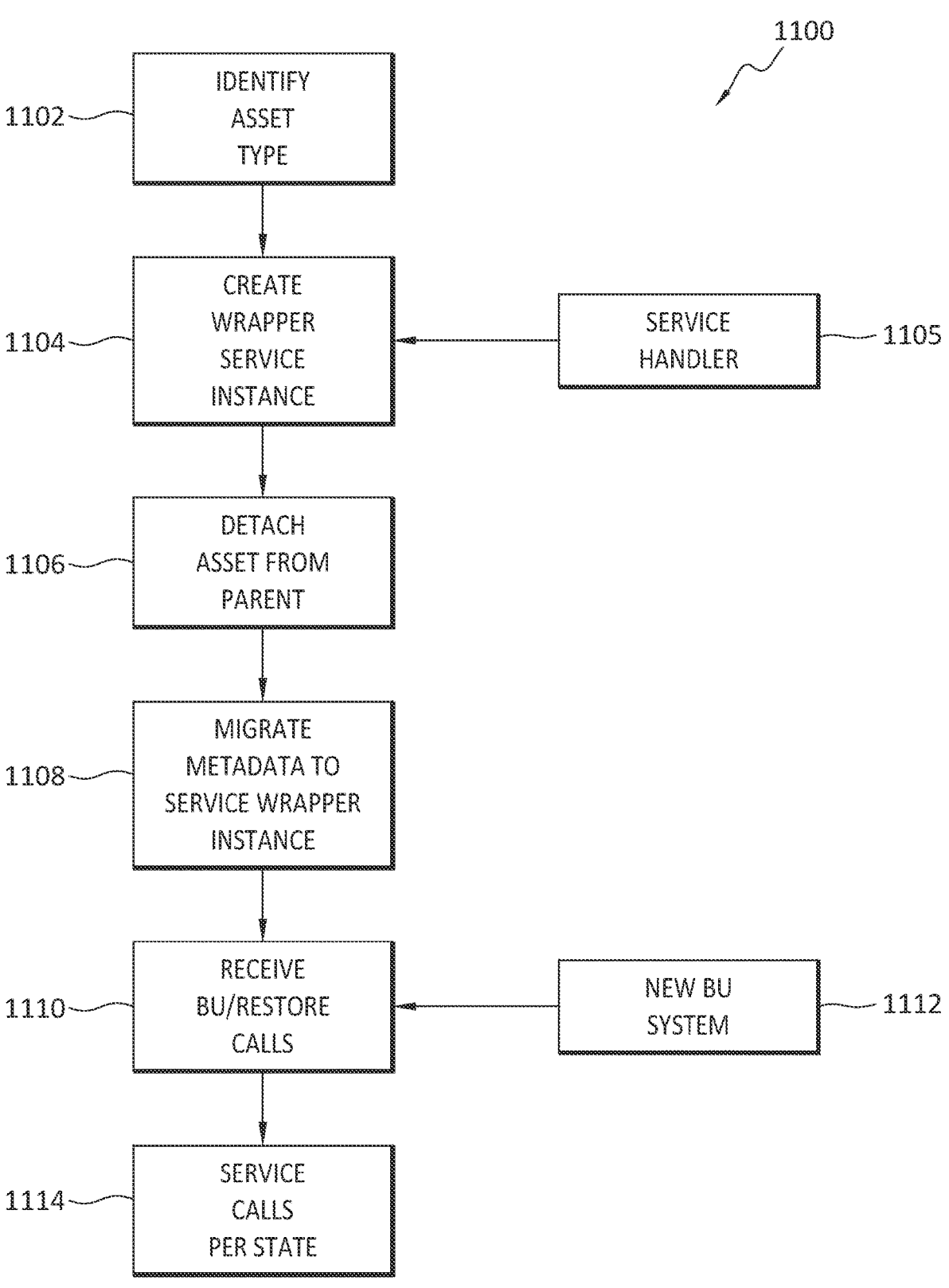
FIG. 11 discloses aspects of an example method according to some embodiments.

It is noted with respect to the example method of FIG. 11 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 11, an example method 1100 according to some embodiments is disclosed. At 1102, a legacy backup asset type may be identified, such as by an administrator or by a new backup system, where example asset types include a filesystem backup asset, or a database backup asset. With the asset type known, a wrapper service instance may be created 1104 that is specific to the legacy backup asset. The wrapper service instance may be created 1104 by a service handler 1105 using a template.

The legacy backup asset to which the wrapper service instance applies may then be detached 1106 from its parent, that is, from the legacy backup system. Metadata relating to the legacy backup asset and the legacy backup system may then be migrated 1108 to the wrapper service instance. The metadata may enable the new backup system, and the wrapper service instance, to interact with the legacy backup After migration of the metadata 1108, the legacy backup asset is able to receive 1110 backup calls and restore calls from the new backup system 1112. The backup calls and restore calls may then be serviced 1114 according to which state the legacy backup asset is in.

F. Further Example Embodiments

Following are some further example embodiments of the invention. These are presented only by way of example and are not intended to limit the scope of the invention in any way.

Embodiment 1. A method, comprising searching a legacy data backup system and identifying, in the legacy data backup system, a legacy backup asset; identifying a type of the legacy backup asset; creating a wrapper service instance that corresponds to the type of the legacy backup asset; detaching the legacy backup asset from the legacy data backup system; receiving, by the legacy backup asset, backup calls and restore calls from a new data backup system that is different from the legacy data backup system; and servicing, by the legacy backup asset the backup calls and restore calls based on a state of the legacy backup asset.

Embodiment 2. The method as recited in embodiment 1, wherein the service wrapper instance is spawned by a service handler using a service wrapper template.

Embodiment 3. The method as recited in any of embodiments 1-2, further comprising migrating legacy backup asset metadata from the legacy data backup system to the new data backup system.

Embodiment 4. The method as recited in any of embodiments 1-3, wherein when the legacy backup asset is in a state (1), both the backup calls and the recovery calls are serviced by the legacy backup system and according to requirements imposed by the new backup system.

Embodiment 5. The method as recited in embodiment 4, wherein the legacy backup asset remains indefinitely in state (1) when the legacy backup asset lacks support in the new backup system.

Embodiment 6. The method as recited in any of embodiments 1-5, wherein when the legacy backup asset is in a state (2), the recovery calls are serviced using the legacy backup system, and the backup calls are serviced by the new backup system.

Embodiment 7. The method as recited in any of embodiments 1-6, wherein when the legacy backup asset is in a state (3), both the backup calls and the recovery calls are serviced by the new backup system.

Embodiment 8. The method as recited in any of embodiments 1-7, wherein the wrapper service instance is implemented as a container.

Embodiment 9. The method as recited in any of embodiments 1-8, wherein the wrapper service instance comprises an abstraction that facilitates communication between the new backup system and the legacy backup system.

Embodiment 10. The method as recited in any of embodiments 1-9, wherein an asset service contract of the wrapper service instance defines one or more operations to be performed by the legacy backup asset, and the asset service contract is accessible by the new backup system.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 12:
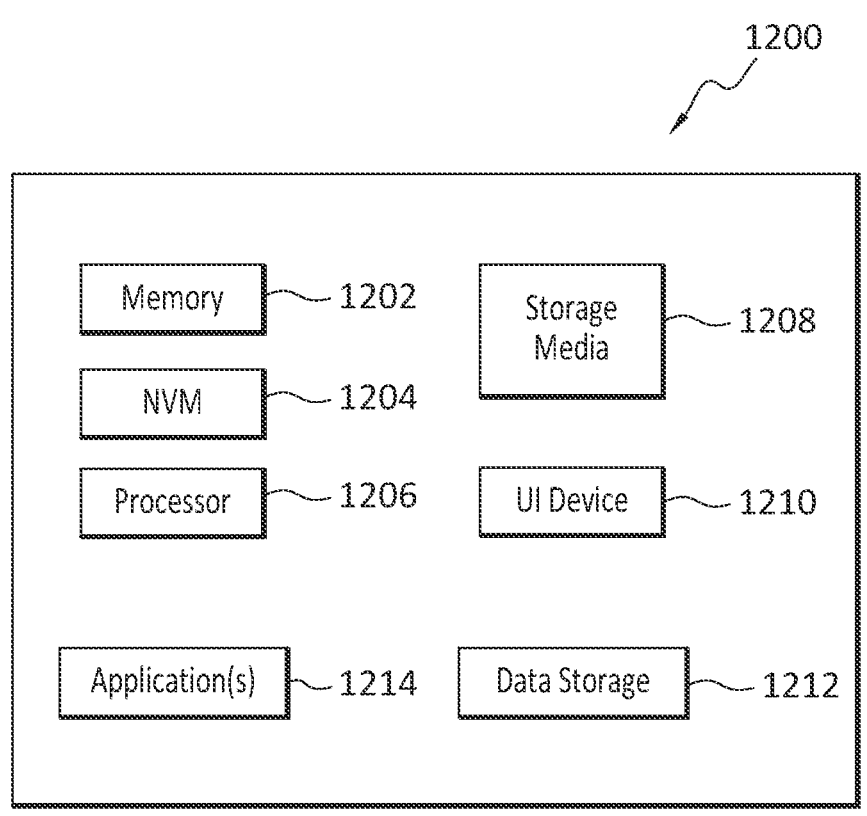
FIG. 12 discloses aspects of an example computing entity operable to perform any of the claimed methods, processes, and operations.

With reference briefly now to FIG. 12, any one or more of the entities disclosed, or implied, by FIGS. 1-11 and/or elsewhere herein, may take the form of, or include, or be implemented on, or hosted by, a physical computing device, one example of which is denoted at 1200. As well, where any of the aforementioned elements comprise or consist of a virtual machine (VM), that VM may constitute a virtualization of any combination of the physical components disclosed in FIG. 12.

In the example of FIG. 12, the physical computing device 1200 includes a memory 1201 which may include one, some, or all, of random access memory (RAM), non-volatile memory (NVM) 1204 such as NVRAM for example, read-only memory (ROM), and persistent memory, one or more hardware processors 1206, non-transitory storage media 1208, UI device 1210, and data storage 1212. One or more of the memory components 1202 of the physical computing device 1200 may take the form of solid state device (SSD) storage. As well, one or more applications 1214 may be provided that comprise instructions executable by one or more hardware processors 1206 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

searching a legacy data backup system and identifying, in the legacy data backup system, a legacy backup asset, wherein the legacy backup asset comprises a hardware element, which includes one or more storages, and a software element of the legacy data backup system, and the legacy backup asset is configured to perform part, or all, of a data backup process and/or a data restore process;

identifying a type of the legacy backup asset;

creating a wrapper service instance that is specific to the legacy data backup system, wherein the wrapper service instance corresponds to the type of the legacy backup asset;

detaching the legacy backup asset from the legacy data backup system;

migrating metadata of the detached legacy backup asset to the wrapper service instance;

attaching the detached legacy backup asset, which includes the hardware element and the software element, to a wrapper service instance of a new data backup system so that the new data backup system controls backup and restore operations via the attached legacy backup asset through the wrapper service instance;

receiving backup calls and restore calls from the new data backup system that is different from the legacy data backup system;

determining a state of the attached legacy backup asset, wherein the state specifies whether the backup calls and/or the restore calls are serviced by the legacy backup system; and servicing, by the attached legacy backup asset through the wrapper service instance and the new data backup system, the backup calls and the restore calls based on the state of the detached attached legacy backup asset, wherein the state is one of a first state that the attached legacy backup asset is not ready to be transitioned from operating in the legacy backup system to operating in the new data backup system, a second state that a transition from the attached legacy backup asset to the new data backup system is being performed, or a third state that the transition from the attached legacy backup asset to the new data backup system has been complete, and wherein, when the legacy backup asset is in the second state, the restore calls are serviced using the legacy backup system, and the backup calls are serviced by the new backup system.

2. The method as recited in claim 1, wherein the service wrapper instance is spawned by a service handler using a service wrapper template.

3. The method as recited in claim 1, further comprising migrating legacy backup asset metadata from the legacy data backup system to the new data backup system.

4. The method as recited in claim 1, wherein when the legacy backup asset is in the first state, both the backup calls and the restore calls are serviced by the legacy backup system and according to requirements imposed by the new backup system.

5. The method as recited in claim 4, wherein the legacy backup asset remains indefinitely in the first state when the legacy backup asset lacks support in the new backup system.

6. The method as recited in claim 1, wherein when the legacy backup asset is in the third state, both the backup calls and the restore calls are serviced by the new backup system.

7. The method as recited in claim 1, wherein the wrapper service instance is implemented as a container.

8. The method as recited in claim 1, wherein the wrapper service instance comprises an abstraction that facilitates communication between the new backup system and the legacy backup system.

9. The method as recited in claim 1, wherein an asset service contract of the wrapper service instance defines one or more operations to be performed by the legacy backup asset, and the asset service contract is accessible by the new backup system.

10. A non-transitory computer readable storage medium having stored therein instructions that are executable by one or more hardware processors to perform operations comprising:

searching a legacy data backup system and identifying, in the legacy data backup system, a legacy backup asset, wherein the legacy backup asset comprises a hardware element, which includes one or more storages, and a software element of the legacy data backup system, and the legacy backup asset is configured to perform part, or all, of a data backup process and/or a data restore process;

identifying a type of the legacy backup asset;

creating a wrapper service instance that is specific to the legacy data backup system, wherein the wrapper service instance corresponds to the type of the legacy backup asset;

detaching the legacy backup asset from the legacy data backup system;

migrating metadata of the detached legacy backup asset to the wrapper service instance;

attaching the detached legacy backup asset, which includes the hardware element and the software element, to a wrapper service instance of a new data backup system so that the new data backup system controls backup and restore operations on the attached legacy backup asset through the wrapper service instance;

receiving backup calls and restore calls from the new data backup system that is different from the legacy data backup system;

determining a state of the attached legacy backup asset, wherein the state specifies whether the backup calls and/or the restore calls are serviced by the legacy backup system; and servicing, by the attached legacy backup asset through the wrapper service instance and the new data backup system, the backup calls and the restore calls based on the state of the attached legacy backup asset, wherein the state is one of a first state that the attached legacy backup asset is not ready to be transitioned from operating in the legacy backup system to operating in the new data backup system, a second state that a transition from the attached legacy backup asset to the new data backup system is being performed, or a third state that the transition from the attached legacy backup asset to the new data backup system has been complete, and wherein, when the legacy backup asset is in the second state, the restore calls are serviced using the legacy backup system, and the backup calls are serviced by the new backup system.

11. The non-transitory computer readable storage medium as recited in claim 10, wherein the service wrapper instance is spawned by a service handler using a service wrapper template.

12. The non-transitory computer readable storage medium as recited in claim 10, further comprising migrating legacy backup asset metadata from the legacy data backup system to the new data backup system.

13. The non-transitory computer readable storage medium as recited in claim 10, wherein when the legacy backup asset is in the first state, both the backup calls and the restore calls are serviced by the legacy backup system and according to requirements imposed by the new backup system.

14. The non-transitory computer readable storage medium as recited in claim 13, wherein the legacy backup asset remains indefinitely in the first state when the legacy backup asset lacks support in the new backup system.

15. The non-transitory computer readable storage medium as recited in claim 10, wherein when the legacy backup asset is in the third state, both the backup calls and the restore calls are serviced by the new backup system.

16. The non-transitory computer readable storage medium as recited in claim 10, wherein the wrapper service instance is implemented as a container.

17. The non-transitory computer readable storage medium as recited in claim 10, wherein the wrapper service instance comprises an abstraction that facilitates communication between the new backup system and the legacy backup system.

18. The non-transitory computer readable storage medium as recited in claim 10, wherein an asset service contract of the wrapper service instance defines one or more operations to be performed by the legacy backup asset, and the asset service contract is accessible by the new backup system.

* * * * *